(12) United States Patent
Breen

(10) Patent No.: US 7,830,032 B1
(45) Date of Patent: Nov. 9, 2010

(54) GENERATING POWER FROM NATURAL WAVES IN A BODY OF WATER

(76) Inventor: Joseph G. Breen, 575 Echo Glen Ave., River Vale, NJ (US) 07675

( * ) Notice: Subject to any disclaimer, the term of this patent is extended or adjusted under 35 U.S.C. 154(b) by 0 days.

(21) Appl. No.: 12/549,729

(22) Filed: Aug. 28, 2009

(51) Int. Cl.
- F03B 13/10 (2006.01)
- F03B 13/12 (2006.01)
- H02P 9/04 (2006.01)
- F03D 9/00 (2006.01)

(52) U.S. Cl. .............................. 290/53; 290/55; 290/54; 60/398

(58) Field of Classification Search ................... 290/53, 290/54, 55; 60/398
See application file for complete search history.

(56) References Cited

U.S. PATENT DOCUMENTS

| | | | | |
|---|---|---|---|---|
| 1,455,718 A | * | 5/1923 | Delong | 417/100 |
| 1,623,341 A | | 4/1927 | Hare | 417/333 |
| 1,665,140 A | * | 4/1928 | Master | 417/331 |
| 1,791,239 A | * | 2/1931 | Braselton | 417/100 |
| 1,930,958 A | | 10/1933 | Parsons | 417/332 |
| 2,484,183 A | | 10/1949 | Paulson | 60/398 |
| 3,487,228 A | * | 12/1969 | Kriegel | 290/52 |
| 3,515,889 A | * | 6/1970 | Kammerer | 290/53 |
| 3,925,986 A | * | 12/1975 | Barwick | 60/398 |
| 4,001,597 A | * | 1/1977 | Graff | 290/53 |
| 4,083,186 A | | 4/1978 | Jackson, Sr. | 60/325 |
| 4,098,081 A | | 7/1978 | Woodman | 60/398 |
| 4,139,984 A | * | 2/1979 | Moody et al. | 60/398 |
| 4,198,821 A | * | 4/1980 | Moody et al. | 60/398 |
| 4,266,403 A | * | 5/1981 | Hirbod | 60/698 |
| 4,271,668 A | * | 6/1981 | McCormick | 60/398 |
| 4,286,347 A | * | 9/1981 | Modisette | 60/398 |
| 4,341,959 A | * | 7/1982 | Ambli | 290/53 |
| 4,425,510 A | * | 1/1984 | Jury | 290/42 |
| 4,454,429 A | * | 6/1984 | Buonome | 290/53 |
| 4,466,244 A | | 8/1984 | Wu | 60/398 |
| 4,622,473 A | | 11/1986 | Curry | 290/53 |
| 4,815,286 A | * | 3/1989 | Watanabe | 60/398 |
| 5,027,000 A | * | 6/1991 | Chino et al. | 290/53 |
| 5,179,837 A | * | 1/1993 | Sieber | 60/500 |
| 5,186,822 A | * | 2/1993 | Tzong et al. | 210/122 |

(Continued)

Primary Examiner—T C Patel
Assistant Examiner—Pedro J Cuevas
(74) Attorney, Agent, or Firm—Arthur Jacob

(57) ABSTRACT

Apparatus and method are provided for generating electrical power from an installation site in a body of water wherein waves occur naturally over an area of the body of water to move the water about a mean water level beneath an ambient atmosphere to effect an alternate rise and fall in the water level about the mean water level. A plurality of chambers are immersed in the body of water such that air is moved out of and into each chamber by the rise and fall of the water level in each chamber. The flow of air out of the chambers is conducted to one of two air turbines while the flow of air into the chambers is conducted to the other of the two air turbines. The two air turbines are coupled for simultaneous and continuous rotation as a unit, and the air turbines are coupled to a generator for generating electrical power. The chambers are spread over an area sufficient to assure a continuous flow of air simultaneously out of at least some chambers and into at least other chambers so that a substantially continuous sir flow is supplied to each air turbine.

15 Claims, 3 Drawing Sheets

U.S. PATENT DOCUMENTS

| | | | | |
|---|---|---|---|---|
| 5,394,695 A * | 3/1995 | Sieber | | 60/398 |
| 5,872,406 A * | 2/1999 | Ullman et al. | | 290/53 |
| 6,216,455 B1 * | 4/2001 | Doleh et al. | | 60/398 |
| 6,574,957 B2 * | 6/2003 | Brumfield | | 60/398 |
| 6,800,954 B1 * | 10/2004 | Meano | | 290/53 |
| 6,930,406 B2 * | 8/2005 | Montgomery | | 290/42 |
| 7,355,298 B2 * | 4/2008 | Cook | | 290/53 |
| 7,726,123 B2 * | 6/2010 | Johnson | | 60/398 |
| 2002/0162326 A1 * | 11/2002 | Brumfield | | 60/398 |
| 2004/0163387 A1 * | 8/2004 | Pineda | | 60/495 |
| 2007/0130929 A1 * | 6/2007 | Khan et al. | | 60/398 |
| 2010/0045045 A1 * | 2/2010 | Turner | | 290/53 |
| 2010/0117365 A1 * | 5/2010 | Ortiz | | 290/53 |
| 2010/0148510 A1 * | 6/2010 | Larivan et al. | | 290/53 |

* cited by examiner

GENERATING POWER FROM NATURAL WAVES IN A BODY OF WATER

The present invention relates generally to the generation of electrical power from waves occurring naturally in a body of water and pertains, more specifically to apparatus for placement in such a body of water, and method, to derive usable electrical power from the rise and fall of the water level relative to a mean water level, as a result of waves at an installation site in the body of water.

The demand for energy is ever increasing while conventional resources from which energy is derived are decreasing at an accelerated rate. Many proposals have been put forth for utilizing renewable resources for the generation of usable energy, among these proposals being the use of renewable biomaterials, wind and water sources. Water has long been the source of hydroelectric power where sufficient natural differences in elevation renders such installations practical.

One vast source of energy which heretofore has eluded practical utilization is the energy within waves which occur naturally in larger bodies of water. The present invention provides apparatus and method for tapping into this almost limitless source of energy in a practical and effective manner. As such, the present invention attains several objects and advantages, some of which are summarized as follows: Provides apparatus and method for deriving energy from waves occurring naturally in a body of water utilizing simple and effective construction and procedure; enables the generation of electrical power at any one of a multitude of installation sites heretofore unavailable as a useful source of energy; provides a less complex apparatus capable of ready manufacture and ready installation, together with ease of operation and increased reliability for decreased maintenance requirements; enables use in an extended range of capacities for meeting the requirements of a wide variety of installation sites; once installed, requires minimal attendance to obtain effective and continued operation; requires a minimum number of relatively simple component parts to obtain maximum effectiveness in the generation of electrical power from natural waves; provides a rugged apparatus capable of reliable operation over a long service life.

The above objects and advantages are attained by the present invention which may be described briefly as apparatus for generating electrical power upon being placed at an installation site in a body of water wherein waves occur naturally over an area of the body of water to move the water about a mean water level beneath an ambient atmosphere to effect an alternate rise and fall in the water level about the mean water level, the apparatus comprising: a plurality of chambers, each chamber having a substantially closed top end and an open bottom end; the chambers being arranged over a field for immersion in the body of water over the area of the body of water at the installation site, oriented with the top end of each chamber located above the mean water level and the bottom end located below the mean water level such that water will enter each chamber through a corresponding open bottom end upon a rise in the water level above the mean water level and will leave each chamber through the corresponding open bottom end upon a fall in the water level below the mean water level; an air outlet adjacent the top end of each chamber; an air inlet adjacent the top end of each chamber; an air exhaust for communicating with the ambient atmosphere at the installation site; an air intake for communicating with the ambient atmosphere at the installation site; a plurality of air outlet conduits, each air outlet conduit communicating with a correspond air outlet; a plurality of air inlet conduits, each air inlet conduit communicating with corresponding air inlet; a first air turbine communicating with the air exhaust and with the air outlet conduits for being driven by air flowing out of each chamber through corresponding air outlets and moved through corresponding air outlet conduits in response to a rise in the water level in each corresponding chamber; a second air turbine communicating with the air intake and with the air inlet conduits for being driven by air flowing into each chamber through corresponding air inlets and moved through corresponding air inlet conduits in response to a rise in the water level in each corresponding chamber; a first valve communicating with each air outlet, each first valve being arranged for opening communication between a corresponding chamber and a corresponding air outlet conduit upon a rise in the water level in the corresponding chamber, and for closing communication between the corresponding chamber and the corresponding air outlet conduit upon a fall in the water level in the corresponding chamber; a second valve communicating with each air inlet, each second valve being arranged for opening communication between a corresponding chamber and a corresponding air inlet conduit upon a fall in the water level in the corresponding chamber, and for closing communication between the corresponding chamber and the corresponding air inlet conduit upon a rise in the water level in the corresponding chamber; the field over which the chambers are arrayed having an area corresponding to the area of the body of water at the installation site such that upon placement of the apparatus at the installation site, air will flow simultaneously through at least some air outlet conduits and at least some air inlet conduits during rise and fall of the water level in corresponding chambers throughout the installation site, such that the first and second air turbines will be driven simultaneously substantially continuously by the flow of air simultaneously through the at least some air outlet conduits and the at least some air inlet conduits; and a generator of electrical power coupled to the first and second air turbines for generating electrical power in response to the driven first and second air turbines.

In addition, the present invention provides a method for generating electrical power from an installation site in a body of water wherein waves occur naturally over an area of the body of water to move the water about a mean water level beneath an ambient atmosphere to effect an alternate rise and fall in the water level about the mean water level, the method comprising: providing a plurality of chambers in an array arranged over a field, each chamber having a substantially closed top end and an open bottom end; immersing the array in the body of water over the area of the body of water at the installation site, oriented with the top end of each chamber located above the mean water level and the bottom end located below the mean water level such that water will enter each chamber through a corresponding open bottom end upon a rise in the water level above the mean water level and will leave each chamber through the corresponding open bottom end upon a fall in the water level below the mean water level; providing communication between each chamber and the ambient atmosphere such that air will flow out of each chamber upon rise of the level of water within each chamber above the mean water level, and air will flow into each chamber upon fall of the level of water within each chamber below the mean water level; driving a first air turbine with air flowing out of each chamber in response to a rise in the water level in each chamber; driving a second air turbine with air flowing into each chamber in response to a fall in the water level in each chamber; providing the field over which the chambers are arrayed with an area corresponding to the area of the body of water at the installation site such that air will flow simultaneously out of at least some of the chambers while air will flow into at least others of the chambers during rise and fall of the water level throughout the installation site, such that the first and second air turbines are driven simultaneously substantially continuously by the flow of air simultaneously into the at least some of the chambers and out of the at least others of the chambers; and coupling a generator of electrical power to the first and second air turbines for generating electrical power in response to the driven first and second air turbines.

The invention will be understood more fully, while still further objects and advantages will become apparent, in the following detailed description of preferred embodiments of the invention illustrated in the accompanying drawing, in which.

Figure 1:
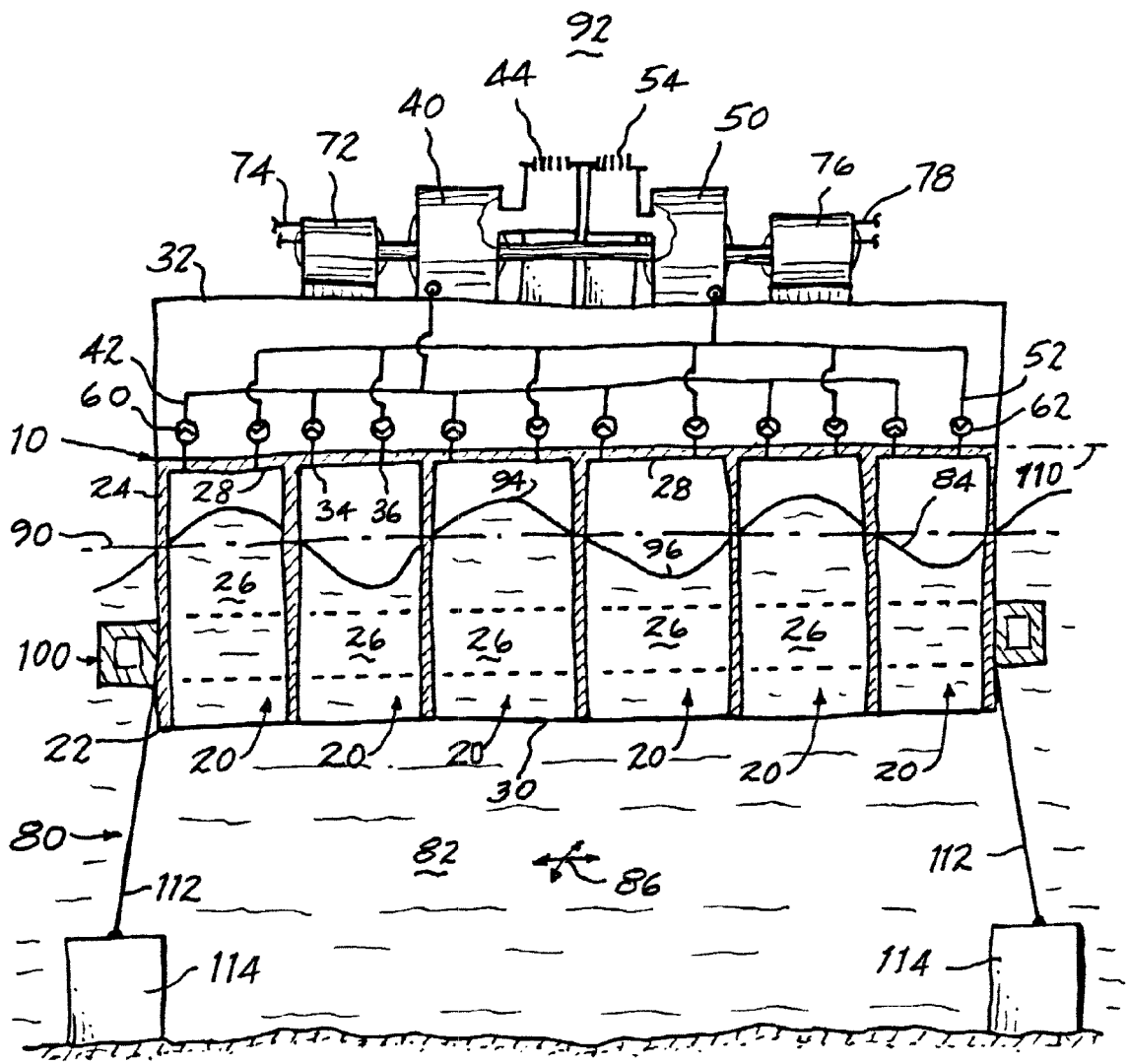
FIG. 1 is a largely schematic side elevational view, partially in cross-section, of an apparatus constructed in accordance with the present invention.
Figure 2:
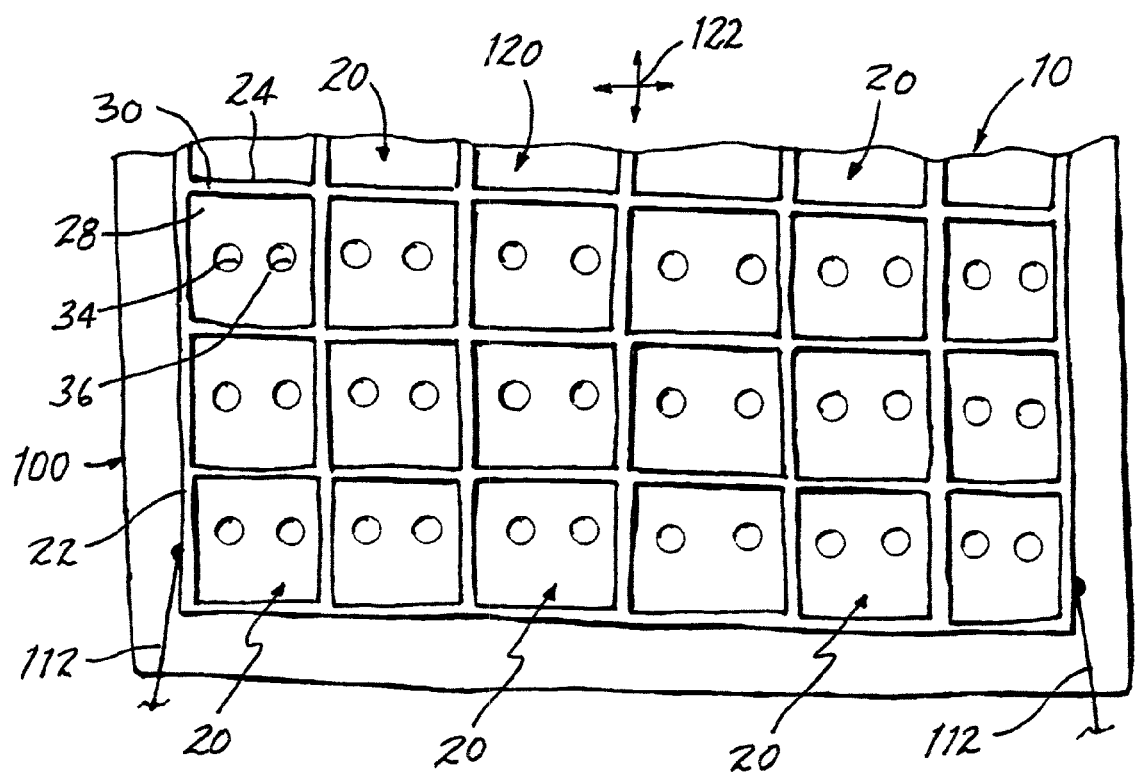
FIG. 2 is a somewhat diagrammatic fragmentary bottom plan view of the apparatus.

Referring now to the drawing, and especially to FIGS. 1 and 2 thereof, an apparatus constructed in accordance with the present invention is shown at 10 and is seen to include a plurality of chambers 20 arranged in an array shown in the form of a matrix 22 of chambers 20. Each chamber 20 has a chamber wall 24 extending axially along the chamber 20 and providing an interior 26 between a substantially closed top end 28 and an open bottom end 30. The matrix 22 is supported by a platform 32, with the chambers 20 oriented so that the interiors 26 are generally parallel, with the top end 28 of each chamber 20 located vertically above the bottom end 30.

Each chamber 20 has an air outlet 34 adjacent corresponding top end 28 and an air inlet 36, also adjacent corresponding top end 28. Each air outlet 34 communicates with a first air turbine 40 through an air outlet conduit 42, the air turbine 40 being carried by the platform 32. An air exhaust 44 communicates with the air turbine 40, the air turbine 40 being placed between the air exhaust 44 and the air outlet conduits 42. Each air inlet 36 communicates with a second air turbine 50 through an air inlet conduit 52, the air turbine 50 also being carried by the platform 32. An air intake 54 communicates with the air turbine 50, the air turbine 50 being placed between the air intake 54 and the air inlet conduits 52.

Figure 3:
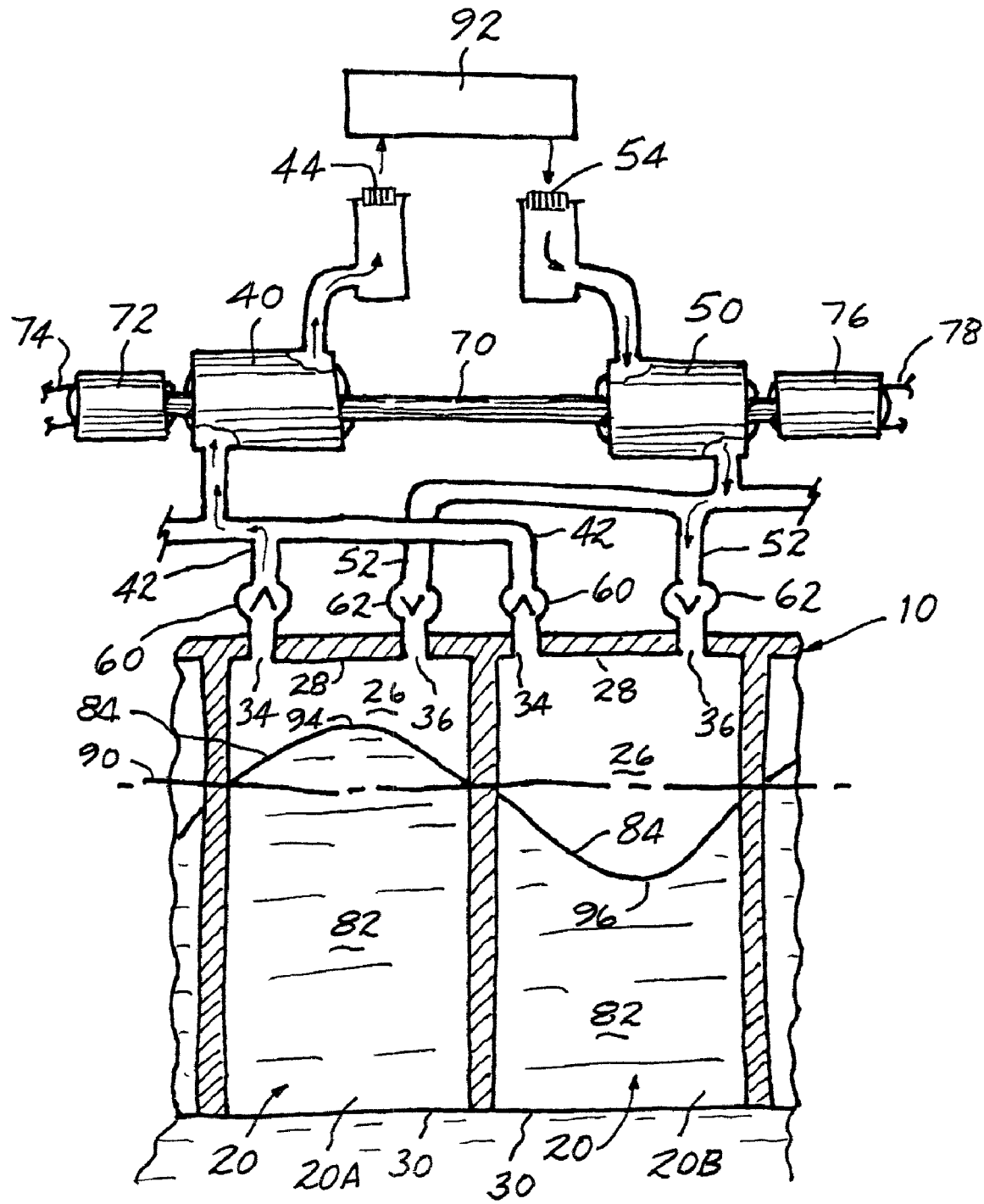
FIG. 3 is an enlarged, fragmentary, somewhat schematic side elevational view, partially in cross-section, showing a portion of the apparatus and illustrating the operation of the apparatus.

As best seen in FIG. 3, a first valve, shown in the form of check valve 60, communicates with each air outlet 34, each check valve 60 being arranged for opening communication between the interior 26 of a chamber 20 and a corresponding air outlet conduit 42 to enable a flow of air from the interior 26 into the air outlet conduit 42, and for closing communication between the interior 26 of the chamber 20 and the corresponding air outlet conduit 42 to preclude a flow of air from the air outlet conduit 42 into the interior 26 of the chamber 20. A second valve, shown in the form of check valve 62, communicates with each air inlet 36, each check valve 62 being arranged for opening communication between the interior 26 of a chamber 20 and a corresponding air inlet conduit 52 to enable a flow of air from the air inlet conduit 52, through the air inlet 36 to the interior 26 of the chamber 20, and for closing communication between the interior 26 of the chamber 20 and the corresponding air inlet conduit 52 to preclude a flow of air from the interior 26 into the air inlet conduit 52 of the chamber 20.

Referring now to FIG. 1, as well as to FIG. 3, a common shaft 70 couples the first and second air turbines 40 and 50 and is journaled for rotation about a common axis of rotation such that air turbines 40 and 50 will rotate as a unit. Shaft 70 extends beyond first air turbine 40 and is engaged with a generator 72 of electrical energy. Generator 72 operates to generate electrical power upon rotation so that upon rotation of air turbine 40 and, consequently, shaft 70, generator 72 will generate electrical power which then is carried away through conductors 74. Optionally, a second generator, illustrated at 76, may be coupled with shaft 70, which then is extended beyond the second air turbine 50, enabling the generation of electrical power which is carried away through conductors 78.

Apparatus 10 is shown installed at an installation site 80 in a body of water 82 wherein waves 84 occur naturally over an area 86 of the body of water 82. As seen in FIGS. 1 and 3, the waves 84 move the water 82 about a mean water level 90, below ambient atmosphere 92, to effect alternate rise and fall in the water level about the mean water level 90, as illustrated by a rise to upper water levels 94, above mean water level 90, and by a fall to lower water levels 96, below mean water level 90. Matrix 22 is placed in the body of water 82 with the chambers 20 oriented vertically and immersed relative to the mean water level 90 so that the top end 28 of each chamber 20 is located above the mean water level 90 and the bottom end 30 is located below the mean water level 90, placing the mean water level 90 intermediate the top end 28 and the bottom end 30 of each chamber 20. The axial length of the chambers 20, between each top end 28 and a corresponding bottom end 30, is made long enough, as determined by the measure of maximum wave heights experienced at installation site 80, to assure that the mean water level 90 always will remain intermediate the top end 28 and the bottom end 30 of each chamber 20. Further, where the body of water 82 is located in tidal waters, chambers 20 are provided with an axial length long enough, as determined by the measure of tidal differences at installation site 80, to assure that the mean water level 90 always will remain intermediate the top ends 28 and the bottom ends 30 of the chambers 20.

A flotation device, shown in the form of a tubular hull 100 is affixed to matrix 22 and is provided with a buoyancy such that upon immersion of the matrix 22 in the body of water 82 at the installation site 80, as described, the matrix 22 is placed at an installed level 110 as shown, wherein the mean water level 90 is located intermediate the top ends 28 and the bottom ends 30 of the chambers 20, as illustrated. An anchoring structure in the form of cables 112 secured at one end to matrix 22 and at opposite ends to weights 114 retains the matrix 22 at the installed level 110 and at the installation site 80.

Turning now to FIG. 3, as well as to FIGS. 1 and 2, once apparatus 10 is installed at installation site 80, as described above, movement of the water 82 by waves 84 through alternate rise and fall in each chamber 20 will operate the apparatus 10 as follows: A rise in the level of water in a chamber 20, as illustrated in FIG. 3 at chamber 20A by a rise to upper water level 94, will move the air in the interior 26 of the chamber 20A upwardly. Check valve 60 then will open in response to the rise in the level of water in chamber 20A and air will flow out of the corresponding interior 26, through air outlet 34 and air outlet conduit 42 to air exhaust 44, passing through air turbine 40. Air turbine 40 is rotated by the flow of air and, in turn, actuates generator 72 to generate electrical power. Simultaneously, a fall in the level of water in another chamber 20, as illustrated in FIG. 3 at chamber 20B, by a fall to lower water level 96, will draw air from ambient atmosphere 92 into the interior 26 of chamber 20B, through air inlet 36 and air inlet conduit 52, from air intake 54, passing through air turbine 50. Air turbine 50 is rotated by the flow of air and, in turn, actuates generator 72 to generate electrical power. A sufficient number of chambers 20 are present in matrix 22 to establish a field 120 of chambers 20 spread over an area 122 corresponding to the area 86 of the body of water 82 at the installation site 80 so that air will flow simultaneously through at least some air outlet conduits 42 and at least some inlet conduits 52 so that air turbines 40 and 50 are driven simultaneously and substantially continuously by the flow of air simultaneously through the at least some air outlet conduits 42 and the at least some air inlet conduits 52. By coupling the two air turbines 40 and 50 together for rotation as a unit, by virtue of common shaft 70, a more effective use of air flow is attained so that the energy derived from waves 84 throughout the area 86 of the body of water 82 is maximized. Further, with the two air turbines 40 and 50 coupled for rotation as a unit, synchronous rotation of the air turbines 40 and 50 is assured, with concomitant balanced and smooth operation and increased efficiency. Moreover, where optional second generator 76 is employed, as described above, the two generators 72 and 76 are synchronized for efficient operation.

It will be seen that the present invention attains all of the objects and advantages summarized above, namely: Provides apparatus and method for deriving energy from waves occurring naturally in a body of water utilizing simple and effective construction and procedure; enables the generation of electrical power at any one of a multitude of installation sites heretofore unavailable as a useful source of energy; provides a less complex apparatus capable of ready manufacture and ready installation, together with ease of operation and increased reliability for decreased maintenance requirements; enables use in an extended range of capacities for meeting the requirements of a wide variety of installation sites; once installed, requires minimal attendance to obtain effective and continued operation; requires a minimum number of relatively simple component parts to obtain maximum effectiveness in the generation of electrical power from natural waves; provides a rugged apparatus capable of reliable operation over a long service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. Apparatus for generating electrical power upon being placed at an installation site in a body of water wherein waves occur naturally over an area of the body of water to move the water about a mean water level beneath an ambient atmosphere to effect an alternate rise and fall in the water level about the mean water level, the apparatus comprising:
   a plurality of chambers, each chamber having a substantially closed top end and an open bottom end;
   the chambers being arranged over a field for immersion in the body of water over the area of the body of water at the installation site, oriented with the top end of each chamber located above the mean water level and the bottom end located below the mean water level such that water will enter each chamber through a corresponding open bottom end upon a rise in the water level above the mean water level and will leave each chamber through the corresponding open bottom end upon a fall in the water level below the mean water level;
   an air outlet adjacent the top end of each chamber;
   an air inlet adjacent the top end of each chamber;
   an air exhaust for communicating with the ambient atmosphere at the installation site;
   an air intake for communicating with the ambient atmosphere at the installation site;
   a plurality of air outlet conduits, each air outlet conduit communicating with a correspond air outlet;
   a plurality of air inlet conduits, each air inlet conduit communicating with a corresponding air inlet;
   a first air turbine communicating with the air exhaust and with the air outlet conduits for being driven by air flowing out of each chamber through corresponding air outlets and moved through corresponding air outlet conduits in response to a rise in the water level in each corresponding chamber;
   a second air turbine communicating with the air intake and with the air inlet conduits for being driven by air flowing into each chamber through corresponding air inlets and moved through corresponding air inlet conduits in response to a fall in the water level in each corresponding chamber;
   a first valve communicating with each air outlet, each first valve being arranged for opening communication between corresponding chamber and a corresponding air outlet conduit upon a rise in the water level in the corresponding chamber, and for closing communication between the corresponding chamber and the corresponding air outlet conduit upon a fall in the water level in the corresponding chamber;
   a second valve communicating with each air inlet, each second valve being arranged for opening communication between a corresponding chamber and a corresponding air inlet conduit upon a fall in the water level in the corresponding chamber, and for closing communication between the corresponding chamber and the corresponding air inlet conduit upon a rise in the water level in the corresponding chamber;
   the field over which the chambers are arrayed having an area corresponding to the area of the body of water at the installation site such that upon placement of the apparatus at the installation site, air will flow simultaneously through at least some air outlet conduits and at least some air inlet conduits during rise and fall of the water level in corresponding chambers throughout the installation site, such that the first and second air turbines will be driven simultaneously substantially continuously by the flow of air simultaneously through the at least some air outlet conduits and the at least some air inlet conduits; and
   a generator of electrical power coupled to the first and second air turbines for generating electrical power in response to the driven first and second air turbines.

2. The apparatus of claim 1 wherein the first valve is a check valve for opening communication between a corresponding chamber and a corresponding air outlet conduit in response to a rise in the water level in the corresponding chamber, and for closing communication between the corresponding chamber and the corresponding air outlet conduit in response to a fall in the water level in the corresponding chamber.

3. The apparatus of claim 1 wherein the second valve is a check valve for opening communication between a corresponding chamber and a corresponding air inlet conduit in response to a fall in the water level in the corresponding chamber, and for closing communication between the corresponding chamber and the corresponding air inlet conduit in response to a rise in the water level in the corresponding chamber.

4. The apparatus of claim 1 wherein:
the first valve is a check valve for opening communication between a corresponding chamber and a corresponding air outlet conduit in response to a rise in the water level in the corresponding chamber, and for closing communication between the corresponding chamber and the corresponding air outlet conduit in response to a fall in the water level in the corresponding chamber; and
the second valve is a check valve for opening communication between a corresponding chamber and a corresponding air inlet conduit in response to a fall in the water level in the corresponding chamber, and for closing communication between the corresponding chamber and the corresponding air inlet conduit in response to a rise in the water level in the corresponding chamber.

5. The apparatus of claim 1 wherein the first and second air turbines each operate by rotation in response to the flow of air through each respective air turbine, and the first and second air turbines are coupled to one-another for rotation as a unit.

6. The apparatus of claim 1 including a flotation device affixed to the array of plural chambers for floating the array in the body of water, the flotation device having a buoyancy such that upon immersion of the array of chambers at the installation site, the array will be placed at an installed level wherein the mean water level will be located intermediate the top ends and the bottom ends of the chambers.

7. The apparatus of claim 6 including an anchoring structure secured to the array of chambers for retaining the array at the installed level at the installation site.

8. The apparatus of claim 6 wherein the first and second air turbines each operate by rotation in response to the flow of air through each respective air turbine, and the first and second air turbines are coupled to one-another for rotation as a unit.

9. The apparatus of claim 8 including an anchoring structure secured to the array of chambers for retaining the array at the installed level at the installation site.

10. A method for generating electrical power from an installation site in a body of water wherein waves occur naturally over an area of the body of water to move the water about a mean water level beneath an ambient atmosphere to effect an alternate rise and fall in the water level about the mean water level, the method comprising:
providing a plurality of chambers in an array arranged over a field, each chamber having a substantially closed top end and an open bottom end;
immersing the array in the body of water over the area of the body of water at the installation site, oriented with the top end of each chamber located above the mean water level and the bottom end located below the mean water level such that water will enter each chamber through a corresponding open bottom end upon a rise in the water level above the mean water level and will leave each chamber through the corresponding open bottom end upon a fall in the water level below the mean water level;
providing communication between each chamber and the ambient atmosphere such that air will flow out of each chamber upon rise of the level of water within each chamber above the mean water level, and air will flow into each chamber upon fall of the level of water within each chamber below the mean water level;
driving a first air turbine with air flowing out of each chamber in response to a rise in the water level in each chamber;
driving a second air turbine with air flowing into each chamber in response to a fall in the water level in each chamber;
providing the field over which the chambers are arrayed with an area corresponding to the area of the body of water at the installation site such that air will flow simultaneously out of at least some of the chambers while air will flow into at least others of the chambers during rise and fall of the water level throughout the installation site, such that the first and second air turbines are driven simultaneously substantially continuously by the flow of air simultaneously into the at least some of the chambers and out of the at least others of the chambers; and
coupling a generator of electrical power to the first and second air turbines for generating electrical power in response to the driven first and second air turbines.

11. The method of claim 10 wherein the first and second air turbines each are operated by rotation in response to the flow of air through each respective air turbine, and the method includes coupling the first and second air turbines to one-another for rotation as a unit.

12. The method of claim 10 including affixing a flotation device to the array of plural chambers to float the array in the body of water, and providing the flotation device with a buoyancy such that upon immersion of the array of chambers at the installation site, the array will be placed at an installed level wherein the mean water level is located intermediate the top ends and the bottom ends of the chambers.

13. The method of claim 12 including anchoring the array of chambers to secure the array at the installed level at the installation site.

14. The method of claim 12 wherein the first and second air turbines each are operated by rotation in response to the flow of air through each respective air turbine, and the method includes coupling the first and second air turbines to one-another for rotation as a unit.

15. The method of claim 14 including anchoring the array of chambers to secure the array at the installed level at the installation site.

* * * * *